United States Patent
Tsuru et al.

(10) Patent No.: US 6,468,652 B1
(45) Date of Patent: Oct. 22, 2002

(54) ELASTIC POLYURETHANE-UREA FIBER AND METHOD FOR PRODUCING THE SAME

(75) Inventors: Keisuke Tsuru; Masanori Doi, both of Moriyama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/936,843

(22) PCT Filed: Mar. 16, 2000

(86) PCT No.: PCT/JP00/01614

§ 371 (c)(1),
(2), (4) Date: Sep. 18, 2001

(87) PCT Pub. No.: WO00/56958

PCT Pub. Date: Sep. 28, 2000

(30) Foreign Application Priority Data

Mar. 19, 1999 (JP) ............................................. 11-075303

(51) Int. Cl.⁷ .................................................. D01F 6/00
(52) U.S. Cl. .................... 428/364; 428/394; 264/205
(58) Field of Search ................................ 428/364, 394; 264/205

(56) References Cited

U.S. PATENT DOCUMENTS

| | | | |
|---|---|---|---|
| 4,973,647 A | 11/1990 | Bretches | 528/61 |
| 5,539,037 A | 7/1996 | Iqbal | 524/394 |
| 5,616,676 A | 4/1997 | Katsuo | 528/61 |

FOREIGN PATENT DOCUMENTS

| | | |
|---|---|---|
| JP | 3-97915 | 4/1991 |
| JP | 4-100919 | 4/1992 |
| JP | 7-150417 | 6/1995 |
| JP | 7-316922 | 12/1995 |
| JP | 8-113824 | 5/1996 |
| JP | 2001140127 A * | 5/2001 |

* cited by examiner

*Primary Examiner*—Newton Edwards
(74) *Attorney, Agent, or Firm*—Finnegan, Henderson, Farabow, Garrett & Dunner, L.L.P.

(57) ABSTRACT

An improved polyurethane-urea elastic fiber is obtained by incorporating a specific urea compound prepared by reacting the following compounds together:

(a) a nitrogen-containing compound having both at least one bifunctional amine group selected from a group consisting of a primary amine group and a secondary amine group and at least one nitrogen-containing group selected from a group consisting of a tertiary nitrogen group and a heterocyclic nitrogen group;

(b) an organic diisocyanate; and (c) at least one compound selected from the group consisting of a mono- or di-alkylmonoamine, an alkylmonoalcohol and an organic monoisocyanate.

With the incorporation of the specific urea compound, the polyurethane-urea elastic fiber which can be fast dyed exhibits enhanced thermosettability and increased elastic functions can be produced through a stabilized spinning process. The improved thermosetting property enables end use products of the present fiber such as swimsuits and panty hose to be firmly shaped and to be substantially free from grinning.

7 Claims, No Drawings

ELASTIC POLYURETHANE-UREA FIBER AND METHOD FOR PRODUCING THE SAME

TECHNICAL FIELD

The present invention relates to a polyurethane-urea elastic fiber excellent in thermosettability and dyeability. Further, it relates to a method for producing a polyurethane-urea elastic fiber having a good elastic function as well as providing a favorable spinning stability.

BACKGROUND ART

A polyurethane-urea elastic fiber is known which is obtained by chain extending an isocyanate-terminated prepolymer synthesized by reacting polyalkylene ether glycol with organic diisocyanate in excess quantity by diamine. The polyurethane-urea elastic fiber has been used as a stretchable functional material while being mixedly knit or woven with polyamide fiber and/or polyester fiber for various fields of clothing, such as foundation garment, socks, panty hose, swim suits, sports wear, leotards or others.

The polyurethane-urea elastic fiber forms strong physical crosslinking of hydrogen bonds, caused by hard segments composed of an urea group, and exhibits an excellent elastic function. However, when the polyurethane-urea elastic fiber is used for fields wherein a shape-retaining property of a product fabric is particularly required; for example, a circular knit fabric field including leg wear such as panty hose or tights, a warp knit fabric filed including underwear and sports wear such as brassieres, girdles or swim suits, or a woven fabric field including outer wear such as bottom suit; processing an intermediate product thereof is problematic in that, because the polyurethane-urea elastic fiber is poor in thermosettability, an intermediate product could not be finished into a predetermined size thereby resulting in formation of a finished product inconvenient for wearing, or a hem of the fabric is liable to curl up to disturb the sewing operation.

Also, when the product is set to have a predetermined width, it is necessary to repeat the setting operation or setting at a relatively high temperature for obtaining a desired result, which deteriorates the productivity and the heat efficiency.

Other elastic fibers having no urea groups but similar to the polyurethane-urea elastic fiber, such as polyurethane elastic fiber (elastic fiber solely composed of urethane bonds) or polyether-ester elastic fiber (polyester copolymerized with polyalkyleneether glycol component), are also known. While these elastic fibers are excellent in thermosettability and shape-retaining property, they have no hard segments composed of urea groups, and therefor are problematic in that the elastic function is liable to be damaged; i.e., the elastic recovery is inferior to the polyurethane-urea elastic fiber or the stretching fatigue becomes larger than that of a polyurethane-urea elastic fiber. In other words, they lack wear-comfort and durability for use as utility clothing. Particularly, the polyether ester elastic fiber not only lacks elongation as an elastic fiber but also has a larger variation in stress relative to the elongation to result in a tight feeling not corresponding to the physical motion. Also, since these elastic fibers are poor in heat-durability, the elastic fibers in the fabric may be damaged or broken in the field, for example, of stretch outer wear in which a high-temperature treatment is necessary or the field, for example, of foundation garment which is difficult to color-match and necessitates the repetition of dyeing, whereby the aesthetic appearance of the products is deteriorated.

Thus, if thermosettability could be imparted to the polyurethane-urea elastic fiber without sacrificing the heat-durability and the elastic function thereof, this fiber could be advantageously used in such fields.

For the purpose of improving the thermosettability of polyurethane-urea elastic fiber with an excellent elastic function, a polyurethane-urea elastic fiber is proposed, in Japanese Unexamined Patent Publication (Kokai) No. 3-97915, which is mainly composed of polyether and in which a terminal prepolymer of isocyanate is chain-extended with a specific mixed diamine, and another polyurethane-urea elastic fiber is proposed, in Japanese Unexamined Patent Publication (Kokai) No. 8-113824, in which diamine, monoamine and prepolymer are polymerized with each other at a specific ratio. In Japanese Unexamined Patent Publication (Kokai) No. 7-150417 a polyurethane-urea elastic fiber in which an alkali metal salt is incorporated therein at a low concentration. The applicant of this application has also disclosed, in Japanese Unexamined Patent Publication (Kokai) No. 7-316922, a further polyurethane-urea elastic fiber and a method for producing the same in which a thermoplastic polymer of any of a specific polyacrylonitrile type polymer, a specific polyurethane polymer and a specific styrene-maleic anhydride copolymer in a range from 1 to 14% by weight is added. However, in all cases, the improvement in thermosettability of the conventional polyurethane-urea elastic fiber is discernible but may be unsatisfactory as well as there being cases in which the elastic function of the polyurethane-urea elastic fiber may be sacrified or the yarn breakage may occur to disturb the spinning operation.

The polyurethane-urea elastic fiber is always mixed with polyamide fiber or polyester fiber and is subjected to a dyeing treatment. An acid dye is mainly used for dyeing the mixture with the polyamide fiber. Since there is no seat group for the acid dye in the polyurethane-urea polymer, most of the dye is distributed to the polyamide fiber, while the elastic fiber is hardly dyed. On the other hand, a disperse dye is mainly used for dyeing the mixture with the polyester fiber. Although the disperse dye easily enters the elastic fiber, it is almost all removed therefrom during the reduction-scouring treatment after the dyeing whereby the elastic fiber is hardly dyed. There may be a case wherein the elastic fiber appears to be dyed if the reduction-scouring treatment is insufficient. In such a case, the dye is removed from the elastic fiber during the laundering or dry-cleaning to deteriorate the color fastness as a whole. Particularly, when dyed in a deep color, if the elastic fiber is not dyed even though the polyamide or polyester fiber has been dyed, there is a problem in that the color tone of the fabric lacks the deepness or the elastic fiber shines brightly or whitely when the fabric is stretched (a so-called "grinning").

There have almost been no proposals in the prior art for satisfactorily solving the above-mentioned problems, by an improvement in the polyurethane-urea fiber itself, or methods for producing a polyurethane-urea elastic fiber excellent in thermosettability as well as in elastic function under the stable spinning condition.

An object of the present invention is to solve the above problems in the prior art and provide a polyurethane-urea elastic fiber excellent in elastic function, heat-durability and thermosettability as well as improved in dyeability to have a good color fastness. Another object of the present invention is to provide a polyurethane-urea elastic fiber capable of manufacturing a fabric excellent in dyeability, shape-retaining property and elastic function as well as free from the grinning phenomenon. A further important object of the present invention is to provide a method for producing a modified polyurethane-urea fiber excellent in elastic function, as described above, in a stable spinning state.

DISCLOSURE OF THE INVENTION

The present inventors have found that a polyurethane-urea elastic fiber containing a specific urea compound, described later, could be modified to be uniquely excellent in elastic function and heat-durability as well as have good thermosettability and dyeability, and such a modified fiber could be produced under a stable spinning condition. Thus, the present invention has been completed.

The present invention is a polyurethane-urea elastic fiber obtained by incorporating a urea compound, in a range from 1 to 15% by weight, in a polyurethane-urea polymer, the urea compound being prepared by reacting together the following compounds:

(a) a nitrogen-containing compound having at least one bifunctional amine group selected from a primary amine and a secondary amine, and having at least one nitrogen-containing group selected from a tertiary nitrogen and a heterocyclic nitrogen, (b) an organic diisocyanate, and (c) at least one compound selected from a group consisting of a mono- or di-alkylmonoamine, an alkylmonoalcohol and an organic monoisocyanate.

The polyurethane-urea elastic fiber and a method for producing the same according to the present invention will be described, in more detail, below.

The urea compound used for the present invention is prepared by reacting together (a) a nitrogen-containing compound having at least one bifunctional amine group selected from a primary amine and a secondary amine, and having at least one nitrogen-containing group selected from a tertiary nitrogen and a heterocyclic nitrogen, (b) an organic diisocyanate, and (c) at least one compound selected from a group consisting of a mono- or di-alkylmonoamine, an alkylmonoalcohol and an organic monoisocyanate. It is necessary to regulate chemical molar equivalents of the above-mentioned (a), (b) and (c) prior to the reaction so that no active terminals are left in the resultant urea compound.

The resultant urea compound contains a tertiary nitrogen skeleton as shown in the following equation (3) and urea bonds as shown in the following equations (4) and (5):

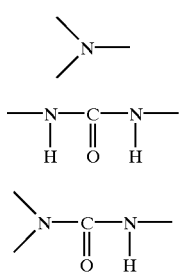

In this regard, when alkylmonoalcohol is reacted, a urethane bond shown in the following equation (6) is contained:

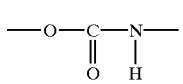

The urea compound according to the present invention is classified into the following two kinds of structure (7) and (8) satisfying the above equations (3) to (6) in accordance with the selection of the compound (c).

i) If mono- or di-alkylmonoamine or alkylmonoalcohol is selected for (c), (c)-[(b)-(a)]n-(b)-(c)                (7)

ii) If organic monoisocyanate is selected for (c), (c)-[(a)-(b)]n-(a)-(c)                (8)

(wherein n is the repetition number of polymerization and is one or more). The structure shown in the equation (8), in which the organic monoisocyanate is selected from (c), is more preferable.

Preferably, urea compounds of the two kinds of structures are used alone separately. However, they may be used in the mixed state.

The nitrogen-containing compound having at least one bifunctional amine group selected from compounds (a) consisting of a primary amine and a secondary amine, and having at least one nitrogen-containing group selected from a tertiary nitrogen and a heterocyclic nitrogen includes, for example, N-butyl-bis(2-aminoethyl)amine, N-butyl-bis(2-aminopropyl)amine, N-butyl-bis(2-aminobutyl)amine, N,N-bis(2-aminoethyl)-isobutylamine, N,N-bis(2-aminopropyl)-isobutylamine, N,N-bis(2-aminoethyl)-t-butylamine, N,N-bis(2-aminoethyl)-1, 1-dimethylpropylamine, N,N-bis(2-aminopropyl)-1, 1-dimethylpropylamine, N,N-bis(2-aminobutyl)-1, 1-dimethylpropylamine, N-(N,N-diethyl-3-aminopropyl)-bis(2-aminoethyl)amine, N-(N,N-dibutyl-3-aminopropyl)-bis(2-aminopropyl)amine, piperazine, piperazine derivatives such as 2-methylpiperazine, 1-(2-aminoethyl)-4-(3-aminopropyl)piperazine, 2,5- and 2,6-dimethylpiperazine, N,N'-bis(2-aminoethyl)piperazine N,N'-bis(3-aminopropyl)piperazine, N-(2-aminomethyl)piperazine, N-(2-aminoethyl)piperazine or N-amino-(2-aminoethyl)-4-methylpiperazine, piperidine derivatives such as 4-aminoethylpiperidine, N-amino-4-(2-aminoethyl)piperidine, N-bis(2-aminoethyl)aminepiperidine, and pyrrolidone derivatives such as N-amino-4-(2-aminoethyl)-2-pyrrolidone, N-(3-aminopropyl)-4-(3-aminopropyl)-2-pyrrolidone, N-bis(2-aminoethyl)amine-2-pyrrolidone. Piperazine and piperazine derivatives are preferable nitrogen-containing compounds. Particularly, N-(2-aminoethyl)piperazine and N-(2-aminopropyl)piperazine are suitable because of their extremely favorable solubility to an amide type solvent of the resultant urea compound. These may be used alone separately or in a mixture.

The organic diisocyanate selected from compounds (b) for obtaining the urea compound according to the present invention includes, for example, trimethylene diisocyanate, tetramethylene diisocyanate, pentamethylene diisocyanate, hexamethylene diisocyanate, 3-methylhexane-1,6-diisocyanate, 3,3'-dimethylpentane-1,5-diisocyanate, 1,3- and 1,4-cyclohexylene-diisocyanate, 4,4'-dicyclohexylmethane-diisocyanate, m- and p-xylylene diisocyanate, α, α, α',α'-tetramethyl-p-xylylene diisocyanate, 4,4'-diphenylmethane diisocyanate, isophorone diisocyanate and 2,4-tolylene diisocyanate. Alicyclic diisocyanates such as isophorone diisocyanate or 4,4'-dicyclohexylmethane-diisocyanate are preferably used. These may be used alone separately or in a mixture.

The mono- or di-alkylmonoamine selected from compounds (c) for obtaining the urea compound according to the present invention is a monoamine having alkyl group having carbon atoms in a range from 1 to 10, including, for example, isopropylamine, n-butylamine, t-butylamine, diethylamine, 2-ethylhexylamine, diisopropylamine, di-n-butylamine, di-t-butylamine, di-isobutylamine and di-2-ethylhexylamine. Also, tertiary nitrogen atoms or oxygen atoms may be contained in the alkyl chain, which includes, for example, 3-dibutylaminopropylamine, 3-diethylaminopropylamine, 3-ethoxypropylamine and 3-(2-ethylhexyloxy)propylamine. These may be used alone separately or in a mixture.

Further, the alkylmonoalcohol in the compounds (c) used for obtaining the urea compound according to the present invention is a mono alcohol having an alkyl group having carbon atoms in a range from 1 to 10, including, for example, methanol, ethanol, 2-propanol, 2-methyl-2-propanol, 1-butanol, 2-ethyl-1-hexanol and 3-methyl-1-butanol. These may be used separately or in a mixture.

The above-mentioned mono- or di-alkylamine and alkylalcohol may be used alone in separate or in a mixture. The separate use is preferable.

Further, the organic monoisocyanate in the compounds (c) used for obtaining the urea compound according to the present invention includes, for example, n-butyl isocyanate, phenyl isocyanate, 1-naphtyl isocyanate, p-chlorophenyl isocyanate, cyclohexayl isocyanate, m-tolyl isocyanate, benzyl isocyanate and m-nitrophenyl isocyanate. These may be used separately or in a mixture. However, they are inhibited from being mixed with the above-mentioned mono- or di-alkylamine or alkylalcohol, because a compound in which active hydrogen is hindered by the organic monoisocyanate is generated to decrease an effective amount of the urea compound of the structure represented by the equation (7) or (8). Moreover, such a compound bleeds out during the treatment process for the polyurethane-urea elastic fiber, causing scum which contaminates a knitting machine and a dyeing bath.

The compound (c) used for the urea compound according to the present invention, which is selected from the three kinds of compounds as described above, blocks active terminals (amino group or isocyanate group) of the urea compounds obtained from the compounds (a) and (b). The active terminal deteriorates the spinning stability of the polyurethane-urea elastic fiber or lowers the color fastness. If the reactive molar equivalent of (a) is larger than that of (b), the urea compound is terminated with amino groups, whereby the organic monoisocyanate must be selected from the compounds (c), while if the reactive molar equivalent of (a) is smaller than that of (b), the urea compound is terminated with isocyanate groups, whereby at least one of mono- or dialkylamine and alkylmonoalcohol must be selected from the compounds (c). Preferably, the organic monoisocyanate is selected as described before.

The urea compound according to the present invention is characterized by having urea bonding units represented by the following equations (9) and (10) in a range from 4 to 40, as an average value, in one molecule. In this regard, the average value is a number-average value.

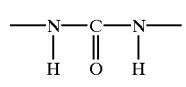

(9)

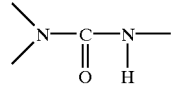

(10)

If the compound (c) is mono- or di-alkylmonoamine or alkylmonoalcohol, the structure of the urea compound is represented by the equation (11) (wherein n represents the repetition number of polymerization which is one or more):

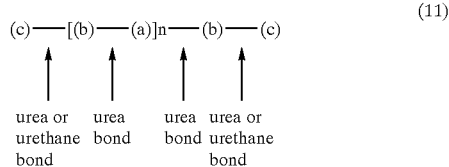

(11)

The urea compound having a desired average number of urea bonding units is obtainable by the adjustment of the reactive molar ratio between the compounds (a), (b) and (c). That is, if it is adjusted to be (a):(b):(c)=n:n+1:2, the average number of urea bonding units in one molecule becomes 2n+2 in the mono- or di-alkylmonoamine and 2n in the alkylmonoalcohol.

If the compound (c) is organic monoisocyanate, the structure of the urea compound is represented by the equation (12) (wherein n represents the repetition number of polymerization which is one or more):

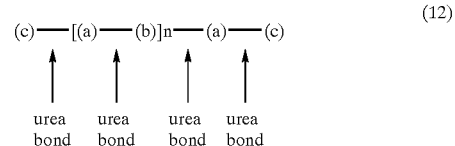

(12)

If it is adjusted to be (a):(b):(c)=n+1:n:2, the average number of urea bonding units in one molecule becomes 2n+2.

The urea compound according to the present invention has the average number of urea bonding units in one molecule is in a range from 4 to 40. If it is converted to the repetition number n of polymerization in the structure, it is in a range from 1 to 19 in a case of the mono- or di-alkylmonoamine and organic monoisocyanate, and in a range from 2 to 20 in a case of the alkylmonoalcohol. If the average number of urea bonding units is less than 4 or more than 40, the thermosettability becomes insufficient. Further, if the average number of urea bonding units is less than 4, scum may be generated due to bleed-out during the treatment process of the polyurethane-urea elastic fiber, resulting in the color contamination of a knitting machine and a dye bath. Also, if the average number of urea bonding units exceeds 40, the urea compound may be separated out from a polyurethane-urea spinning dope to cause yarn breakage during the spinning operation or to lower the elongation of the polyurethane-urea elastic fiber, whereby the elastic function thereof is deteriorated. The average number of urea bonding units is preferably in a range from 4 to 15 in one molecule.

The number of urea bonding units existing in one molecule of the urea compound according to the present invention is adjustable in accordance with molar ratios between (a), (b) and (c). A reaction temperature is preferably in a range from 20 to 60° C. The reaction is preferably carried out in an amide type polar solvent in which the polyurethane-urea polymer is soluble, such as dimethylformamide, dimethylacetamide or N-methylpyrrolidone. When a solvent in which the polyurethane-urea polymer is insoluble is used, it is possible to dissolve solid component product obtained after the reaction in another solvent in which the polyurethane-urea polymer is soluble and add the solution to the polyurethane-urea polymer.

As one example of the reaction, 2 mols of N-(2-aminomethyl)piperazine selected from (a), 1 mol of isophorone diiscyanate selected from (b) and 2 mols of phenylisocyanate selected from (c) are reacted with each other at 50° C. for 2 hours to result in a dimethylacetamide solution of 50% by weight. The reaction may be carried by dripping isophorone diisocyanate and phenylisocyanate into N-(2-aminomethyl)piperazine dissolved in dimethylacetamide. However, the reaction should not be limited thereto but includes other known methods. The urea compound thus obtained has the repetition number of polymerization n of 1, and the number of urea bonding units of 4 in one molecule.

The polyurethane-urea elastic fiber according to the present invention may be obtained by dry-spinning a spinning dope prepared by adding the urea compound dissolved in the amide type polar solvent to the solution of polyurethane-urea polymer. The addition could be carried out at an optional stage from the completion of the polymerization of polyurethane-urea polymer until the initiation of the spinning.

An amount of the urea compound to be contained in the polyurethane-urea elastic fiber according to the present invention may be such that the settability and the dyeability necessary for the resultant fabric are satisfactory unless the elastic function and the spinning stability are damaged; which is preferably in a range from 1 to 15% by weight relative to the polyurathane-urea polymer. If the amount of the urea compound to be added is less than 1% by weight, the thermosettability and the dyeability become inferior. Contrarily, if it exceeds 15% by weight, an effect of the thermosettability is saturated not only to deteriorate the color fastness but also to disturb the spinning stability due to the generation of yarn breakage as well as to lower the elastic function such as strength, elongation or elastic recovery. A preferable amount is in a range from 2 to 10% by weight.

In this respect, although the thermosetting effect may be improved if the urea compound is added to a polyurethane elastic fiber (an elastic fiber consisting solely of urethane bonds), an extent of the improvement is less than that when the same is added to the polyurethane-urea elastic fiber, and, in addition, the elastic function and the spinning stability of the polyurethane elastic fiber may be deteriorated.

Known arts for improving the thermosettability may be also used for modifying the polyurethane-urea elastic fiber according to the present invention. For example, at least one kind of thermoplastic polymer selected from a group consisting of a polyacrylonitrile type polymer, polyurethane polymer and styrene-maleic anhydride copolymer described in Japanese Unexamined Patent Publication (Kokai) No. 7-316922 may be simultaneously contained in combination with the urea compound, according to the present invention. Preferably, in such a case, a total amount of the thermoplastic polymer and the urea compound according to the present invention is 15% by weight or less, and an amount of the thermoplastic polymer does not exceed that of the urea compound according to the present invention.

It is not clear why the polyurethane-urea elastic fiber containing the urea compound according to the present invention exhibits an excellent thermosettability and dyeability without sacrificing the heat-durability, elastic function and spinning stability. However, one explanation is as follows. The excellent dyeability and color fastness may be caused by the effect of a specific nitrogen-containing compound, i.e., that of the urea compound containing a specific number of urea bonding units. In other words, it is surmised that a nitrogen-containing compound having at least one bifunctional amine group selected from a primary amine and a secondary amine, and having at least one nitrogen-containing group selected from a tertiary nitrogen and a heterocyclic nitrogen, strongly adsorbs and retains the acid dye or disperse dye.

On the other hand, it is surmised that the excellent thermosettability is derived from the urea compound having the average number of urea bonding units in a range from 4 to 40. The polyurethane-urea elastic fiber is a segmented polymer having urethane bonds and urea bonds. Of them, the urea bonds build an extremely strong physical crosslink of a hydrogen bond between them to form a crystalline domain. Accordingly, this fiber exhibits an excellent elastic function under the normal temperature but is difficult to be heat-set because the hydrogen bond is hardly broken even at a high temperature. The urea compound, according to the present invention, having a specific number of urea bonding units strongly hydrogen-bonds to the urea bonds in the polyurethane-urea elastic fiber to merge into a crystalline domain in the polyurethane-urea elastic fiber, resulting in the polyurethane-urea elastic fiber exhibiting an excellent elastic function under normal temperature. However, the urea compound according to the present invention is operative to lower a glass transition point of the crystalline domain. Thus, the hydrogen bond is broken under a high temperature, whereby the crystalline domain easily heat-flows to result in the polyurethane-urea elastic fiber excellent in thermosettability. If an amount of the urea compound according to the present invention is excessively small relative to the polyurethane-urea elastic fiber, the thermosetting effect becomes insufficient. On the other hand, if excessively large, the thermosetting effect becomes satisfactory but the glass transition point of the crystalline domain lowers too much, whereby a heat flow is generated, due to the high temperature, during the spinning operation to not only disturb the spinning stability but also to damage the elastic function.

The polyurethane-urea polymer according to the present invention is prepared from a polymer glycol having hydroxyl groups at opposite terminals and having a number-average molecular weight in a range from 600 to 5000, an organic diisocyanate, a chain extender of diamine compound and a terminal blocker of monoamine compound. The polymer glycol includes, for example, various diols consisting of substantially linear homo- or copolymer, such as polyester diol, polyether diol, polyesteramide diol, polyacryl diol, polythioester diol, polythioether diol or polycarbonate diol, or mixtures thereof or copolymers thereof. Of them, polyalkyleneether glycol is preferable, including, for example, polyoxyethylene glycol, polyoxypropylene glycol, polytetramethylene ether glycol, polyoxypentamethylene glycol, polyether-glycol copolymer consisting of tetramethylene group and 2,2-dimethylpropylene group, polyether-glycol copolymer consisting of tetramethylene group and 3-methyltetramethylene group and mixtures thereof. Of them, polytetramethylene ether glycol, polyether-glycol copolymer consisting of tetramethylene group and 2,2-dimethylpropylene group is preferable because of its excellent elastic function. The organic diisocyanate used for the polyurethane-urea polymer according to the present invention may be optionally selected from aliphatic, alicyclic and aromatic diisocyanates, provided it is soluble in an amide type polar solvent or liquefied under the reactive condition. It includes, for example, 4,4'-diphenylmethane diisocyanate, 2,4'-diphenylmethane diisocyanate, 2,4-and 2,6-tolylene diiocyanate, m- and p-xylylene diisocyanate, α, α, α',α'-tetramethyl-xylylene diisocyanate, 4,4'-diphenylether diisocyanate, 4,4'-dicyclohexyl diisocyanate, 1,3- and 1,4-cyclohexylene diisocyanate, 3-(α-isocyanateethyl) phenylisocyanate, 1,6-hexamethylene diisocyanate, trimethylene diisocyanate, tetramethylene diisocyanate and isophorone diisocyanate, mixtures thereof and copolymers thereof. Of them, 4,4'-diphenylmethane diisocyanate is preferable.

The diamine compound used as a chain extender in the polyurethane-urea polymer according to the present invention includes, for example, ethylenediamine, 1,2-propylenediamine, 1,3-diaminocyclohexane, 2-methyl-1,5-pentadiamine, hexamethylenediamine, triethylenediamine, m-xylylenediamine, piperazine, o-, m- and p-phenylenediamine, a diamine having urea group which is described in Japanese Unexamined Patent Publication (Kokai) No. 5-155841 and mixtures thereof. Of them, ethylenediamine alone, or mixtures of ethylenediamine containing 5 to 40 molar % of at least one kind selected from a group consisting of 1,2-propylenediamine, 1,3-diaminocyclohexane and 2-methyl-1,5-pentadiamine are preferred.

The monoamine compound used as a terminal blocker in the polyurethane-urea polymer according to the present invention includes, for example, a monoalkylamine such as isopropylamine, n-butylamine, t-butylamine or 2-ethylhexylamine, and a dialkylamine such as diethylamine, diisopropylamine, di-n-butylamine, di-t-butylamine, di-isobutylamine, di-2-ethylhexylamine, which may be used alone or as a mixture. Also, 1,1-dimethylhydrazine may be mixed with the above monoamine compound.

The polyurethane-urea polymer can be prepared by a known polyurethane-urea reaction technology. For instance, an excessive molar amount of organic diisocyanate is reacted with polyalkyleneether glycol having a number-average molecular weight in a range from 600 to 5000 in an amide type polar solvent to prepare an intermediate polymer having isocyanate groups at the terminals. Then, the intermediate polymer is dissolved in an amide type polar solvent to react the chain extender with the terminal blocker, resulting in the polyurethane-urea polymer.

The polyurethane-urea elastic fiber according to the present invention is obtainable by the dry spinning of a dope in which the urea compound according to the present invention in a range from 1 to 15% by weight is contained in the polyurethane-urea polymer.

Organic or inorganic compounding agents, other than the urea compound according to the present invention, useful for known polyurethane-urea elastic fiber, polyurethane elastic fiber and/or polyurethane compound may be added simultaneously or sequentially to the spinning dope, such as an ultraviolet absorber, antioxidant, light stabilizer, gas-resistant anti-coloring agent, colorant, delusterant, lubricant or others.

The spinning dope of polyurethane-urea polymer obtained in such a manner may be spun into a fiber form through a known dry or wet spinning method to be a polyurethane-urea elastic fiber. The dry spinning method is preferable in view of the superiority in elastic function and productivity.

The polyurethane-urea elastic fiber preferably has a large single filament size in view of an improvement in thermosettability. A preferable range of the single filament size is from 6 to 33 dtx. This is because the relaxation of orientation is larger in a crystalline domain of the fiber structure. If the single filament size is less than 6 dtex, the orientation is too large, while if it exceeds 33 dtex, the crystalline size becomes too large although the relaxation of orientation becomes small, in both of which cases the crystalline flow becomes difficult during the heat-set treatment. This is true not only of the pourethane-urea elastic fiber but also of all kinds of elastic fibers.

A thermosettability used in the present invention is defined by the combination of a wet-heat treatment at 120° with a dry-heat treatment at 120° C. Since the elastic fiber is often dried by heated air after being subjected to a wet-heat treatment (steam set or dyeing) in an actual process, the thermosettability used in the present invention is more suitable for the actual circumstances than the estimation based solely on the dry- or wet-heat treatment. The polyurethane-urea elastic fiber according to the present invention preferably has the thermosettability defined by the present invention of 50% or more. If this value is less than 50%, problems are liable to occur, such as insufficient shape-retaining property of the resultant product or generation of hem-curling in the resultant fabric. The thermosettability is more preferably 60% or more.

The polyurethane-urea fiber according to the present invention preferably has a strength-retaining ratio of 50% or more after being dry-heated at 180° C. If it is less than 50%, the heat-durability becomes too low and the elastic fiber in the fabric is worn or broken by a high-temperature treatment, setting or redyeing of the fabric. More preferably, the strength-retaining ratio is 60% or more.

The resultant polyurethane-urea elastic fiber may be imparted with polydimethylsiloxane, polyester-modified silicone, polyether-modified silicone, amino-modified silicone, mineral oil, mineral particulate such as silica, colloidal alumina or talc, higher fatty acid metallic powder such as magnesium stearate or calcium stearate, oil in a solid form under the normal temperature such as higher aliphatic carboxylic acid, higher aliphatic alcohol, paraffin or polyethylene, which are used alone or as optionally being mixed if necessary.

The polyurethane-urea elastic fiber according to the present invention is seldom knitted or woven alone but is mixedly knitted or woven with a natural fiber such as cotton, silk or wool, a polyamide fiber such as N6 or N66, a polyester fiber such as polyethylene terephthalate fiber, polytrimethylene terephthalate fiber, or polytetramethylene terephthalate fiber, a cation-dyeable polyester fiber, cuprammonium rayon, viscose rayon or acetate rayon, or covered, entangled or twisted with the latter fibers to form a finished yarn which is then knitted or woven to form a fabric.

The fabric obtained from the polyurethane-urea elastic fiber according to the present invention may be used for swim suits, a stretchable foundation garment such as girdles, brassiere or intimate goods, underwear, an elastic band for a sock-top, tights, panty hose, waist bands, body suits, spats, stretchable sportswear, stretchable outerwear, bandages, supporters, medical wear, stretchable liners or paper diapers.

BEST MODES FOR CARRYING OUT THE INVENTION

Prior to describing the preferred embodiments of the present invention, various measurements for estimating the performance thereof and a method for preparing panty hose will be explained below.

[1] Measurement of Strength at Break, Elongation at Break and Elastic Recovery

A test yarn of 5 cm long is subjected to a tensile test by using a tensile tester (Type UTM-III-100 manufactured by Kabushikikaisha TOYO BALDWIN in the atmosphere of 20° C., 65% RH at a stretching speed of 50 cm/min to obtain a strength at break (g) and an elongation at break (%).

Elastic recovery is estimated as a stress-retaining ratio (%) at 200% elongation by repeating three times the stretching of the test yarn from 0 to 300%, from which the modulus thereof at 200% elongation are measured in the forward and backward paths of the third cycle. The stress-retaining ratio (%) at 200% elongation is calculated by the following equation (13)

$$\text{Stress-retaining ratio (\%) at 200\% elongation} = (fR/fS) \times 100 \quad (13)$$

wherein fR is a modulus at 200% elongation in the forward path of the third cycle of the repeated stretching from 0 to 300%, and fS is a modulus at 200% elongation in the forward path of the third cycle of the repeated stretching from 0 to 300%. The higher the stress-retaining ratio at 200% elongation, the more excellent the elastic recovery.

[2] Estimation of Heat-durability

A test yarn of 14 cm long is stretched to be 21 cm and brought into contact with a stainless steel pillar having a surface temperature of 185° C. (the portion of the pillar to be in contact with the test yarn is approximately 1 cm). A time period (in second) is measured until the test yarn is broken by heat. The longer the time period, the higher the heat-durability. If the fiber is excellent in heat-durability, the resultant fabric does not become thin or lean even after being dyed, set or redyed at a high temperature and the yarn in the fabric is free from yarn breakage.

[3] Estimation of Thermosettability

A test yarn having an initial length of 5 cm is elongated by 100% and left in an atmosphere of pressurized steam at 120° C. for 15 seconds, after which it is dried in a dryer at 120° C. for 30 seconds. Then, it is relaxed in an atmosphere at 50° C. for 1 hour. Further, after it is left in an atmosphere at 20° C. and 65% RH for 16 hours, a length (L cm) of the test yarn is measured. In this regard, the relaxation at 50° C. is a treatment for accelerating the change with time. The thermosettability is calculated from the following equation (14):

$$\text{Thermosettability } (\%) = (L-5)/5 \times 100 \tag{14}$$

The higher the thermosettability, the more excellent the shape-retaining property of the fabric.

[4] Estimation of Strength-retaining Ratio After Being Dry-heated at 180° C.

A test yarn having an initial length of 5 cm is heat-treated while being stretched at 100% elongation in a dryer at 180° C. for 1 minute. After being left in an atmosphere at 25° C. and 60% RH for 16 hours, a strength at break of the test yarn is measured in accordance with the method defined in [1]. Although a length of the test yarn is changed from the initial length, the measurement is carried out in a portion corresponding to the initial length of 5 cm. A ratio (%) of the strength at break of the treated test yarn relative to that of the untreated test yarn is defined as a strength-retaining ratio. The higher the ratio, the higher the heat-durability; thus the fabric does no become thin or lean even after the high temperature dyeing, high-temperature setting and redyeing and the yarn in the fabric is free from yarn breakage.

[5] Estimation of Dyeability and Color Fastness

A bare knit fabric is prepared from test yarns by using a circular knitting machine (CR-C type, manufactured by KOIKE KIKAI SEISAKUSHO K.K.). The bare knit fabric of 1.2 g weight is put into a stainless steel container together with a bare knit fabric obtained from polyamide fibers of 4.8 g weight and dyed with an acid milling dye (black) 4% owf at a bath ratio of 1:50, pH 4.0, 90° C. for 60 minutes. After being subjected to a fixing treatment and treated with a softener, the knit fabric is rinsed with water and air-dried, after which a dyed state is estimated according to a five-grade estimation system consisting of criteria from a fifth grade (most-deeply dyed) to a first grade (most-palely dyed). The higher the grade, the deeper and more preferable the dyed color.

The above-mentioned dyed bare knit fabric of 1 g weight and the polyamide fiber bare knit fabric of 1 g weight are laundered with a 0.8 g/L detergent solution of 300 cc. After being rinsed with water, the knit fabric is air-dried. The dyed state of the bare knit fabric of the test yarns is estimated according to five-grade estimation system. The higher the grade, the deeper and more preferable the dyed color. Also, the color contamination of the polyamide fiber bare knit fabric is estimated in accordance with the five-grade estimation system consisting of criteria from a fifth grade (most-palely color-staining) to a first grade (most-deeply color-staining). The higher the grade, the less the color-staining.

[6] Preparation of Panty Hose

A polyamide elastic fiber (manufactured by ASAHI KASEI KOGYO K.K.; Leona, 11 dtex/5f) and a test yarn are subjected to a covering treatment (a draft ratio of 2.7 and the number of twists of 1600 T/m; to obtain two single-covered S-twist yarns and two Z-twist yarns, respectively). The covered yarns are fed to a knitting machine (NAGATA SIMPLEX KT-6 type; 400 gauges) through all of four yarn holes to knit a so-called "Zokki" (high-quality) panty hose of 2500 total courses (a panty hose wherein all the courses are knit from the covered yarns). The knit fabric is preset at 50° C., and then dyed at 95° C. for 45 minutes. After being subjected to a fixing treatment and treated with a softener, the knit fabric is put on a foot mold and heat-set with a pressurized steam at 120° C. for 15 seconds, after which it is dried at 120° C. for 30 seconds. The knit fabric is taken off from the foot mold and left in an atmosphere of 20° C. and 65% RH for three days.

[7] Estimation of Thermosettability of Panty Hose

A length (cm) of a leg section of the panty hose prepared as described above is measured. The longer the length, the better the thermosettability of the test yarn used therein.

[8] Estimation of Spinning Stability

When a polyurethane-urea spinning dope is made to pass through a 40 μm NASLON (phonetic) filter (manufactured by NIPPON SEISEN K.K.) and dry-spun through two orifices of 0.15 mmφ of a spinneret at 230° C. to result in a polyurethane-urea elastic fiber of 17 dtex/2f, a take-up speed is initially fixed at 300 m/min for five minutes and then gradually increased until yarn breakage occurs in a spinning tube. Assuming that the take-up speed at which the yarn breakage occurs is X m/min, an extremity of a single filament size represented by the following equation (15) is used for estimating the spinning stability:

$$\text{Extremity of a single filament size (dtex)} = (17/2) \times 300/X \tag{15}$$

The smaller the extremity of a single filament size, the better the spinning stability.

EXAMPLES

While the present invention will be more concretely described with reference to examples, it should be appreciated that the present invention is not limited thereto.

Example 1

1500 g of polytetramethylene ether glycol having a number-average molecular weight of 1800 and 312 g of 4,4-diphenylmethane diisocyanate were agitated together to be reacted with each other in a nitrogen gas stream at 60° C. for 90 minutes to result in polyurethane prepolymer having isocyanate groups. Then, the prepolymer was cooled to a room temperature and added with dry dimethylformamide of 2600 g to obtain a polyurethane prepolymer soloution. On the other hand, 23.4 g of ethylene diamine and 3.7 g of diethylamine were dissolved into 1400 g of dry dimethylformamide, which solution was added to the above-mentioned prepolymer solution at a room temperature to result in a polyurethane-urea polymer solution having a viscosity of 320 pascal.sec (30° C.).

Isobutylene addition product of polyaddition compound of p-cresol and dicyclopentadiene at 1.5% by weight, N,N-bis(2-hydroxyethyl)-t-butylamine at 2.5% by weight, 2-(2'-hydroxy-3',5-dibenzyl-phenyl)benzotriazole at 0.3% by weight, magnesium stearate at 0.05% by weight, and urea compound at 6% by weight consisting of N-(2-aminiethyl)piperazine, 4,4-diphenylmethane diisocyanate and phenylisocyanate (a molar ratio of 2:1:2) to have an average number of urea bonding units of 4 was added to the resultant polymer solution to be a spinning dope.

The spinning dope was dry-spun at a spinning speed of 600 m/min and a hot air temperature of 230° C. to obtain a polyurethane-urea elastic fiber of 17 dtex/ 2f.

Examples 2 to 5

The urea compound used in Example 1 was replaced by that of 6% by weight consisting of N-(2-aminiethyl)piperazine, isophorone diisocyanate and phenylisocyanate (a molar ratio of 2:1:2) to have an average number of urea bonding units of 4, that of 8% by weight consisting of N,N-bis(2-aminoethyl)-1, 1-dimethylpropylamine, isophorone diisocyanate and cyclohexyl isocyanate (a molar ratio of 3:2:2) to have an average number of urea bonding units of 6, that of 8% by weight consisting of N-(2-aminoethyl)

piperazine, hexamethylene diisocyanate and t-butylamine (a molar ratio of 2:3:2) to have an average number of urea bonding units of 6, and that of 8% by weight consisting of N-(2-aminoethyl)piperazine, isophorone diisocyanate and 1-butanol (a molar ratio of 3:4:2) to have an average number of urea bonding units of 6, respectively, and polyurethane-urea elastic fibers were spun in the same manner as in Example 1.

Example 6

The urea compound of 8% by weight used in Example 2 having an average number of urea bonding units of 17 (a molar ratio of 17:15:4) was added and a polyurethane-urea elastic fiber was spun in the same manner as in Example 1.

Example 7

Instead of the urea compound in Example 1, polyurethane polymer of 4% by weight described in Example 4 of Japanese Unexamined Patent Publication (Kokai) No. 7-316922 (polyurethane polymer consisting of 1,4-butanediol, polytetramethylene ether glycol having a number-average molecular weight of 650 (a molar ratio of 9:1) and 4,4'-diphenylmethane-diisocyanate (a molar ratio of 0.99:0.11:1) having a number-average molecular weight of 30000) and urea compound of 4% by weight consisting of N,N'-bis(3-aminopropyl)piperazine, isophorone diisocyanate and phenylisocyanate (a molar ratio of 2:1:2) to have an average number of urea bonding units of 4 were added instead of the urea compound used in Example 1, and a polyurethane-urea elastic fiber was spun in the same manner as in Example 1.

Comparative Examples 1 to 3

Polyurethane-urea elastic fibers were manufactured while changing amounts of the urea compound to be added in Example 1 to 0, 0.4 and 18% by weight, respectively.

Comparative Example 4

The urea compound used in Example 2 adjusted to have an average number of urea bonding units 45 (a molar ratio of 45:43:4) was added at 8% by weight, and a polyurethane-urea elastic fiber was spun in the same manner as in Example 1. However, the spinning was impossible because yarn breakage often occurred.

Comparative Example 5

In Example 7, a polyurethane-urea elastic fiber was produced by adjusting the urethane compound to 8% by weight and the urea compound to 0% by weight.

Comparative Example 6

Potassium benzoate of 0.12% by weight described in Example 1 of Kokai No. 7-150417 was added instead of the urea compound used in Example 1, and a polyurethane-urea elastic fiber was spun.

The estimation results of a strength at break, elongation at break, elastic recovery, heat durability, strength-retaining ratio after being dry-heated at 180° C., thermosettability, dyeability, color fastness and spinning stability of the polyurethane-urea elastic fibers obtained from Examples 1 to 7 and Comparative examples 1 to 6 are shown in Tables 1 and 2.

TABLE 1

Composition of urea compound to be added

| | Urea compound | | | | | | |
|---|---|---|---|---|---|---|---|
| | Nitrogen-containing compound (a) | Organic diisocyanate (b) | One kind selected from mono- or di-alkylmonoamine, alkylmonoalcohol and organic monoisocyanate (c) | (a):(b):(c) Reactive molar ratio | Number of urea bonding units | Amount to be added to polyurethane-urea polymer (% by weight) | Known art |
| Example 1 | N-(2-aminoethyl)piperazine | 4,4'-diphenylmethane diisocyanate | phenylisocyante | 2:1:2 | 4 | 6.0 | — |
| Example 2 | N-(2-aminoethyl)piperazine | isophorone diisocyanate | phenylisocyanate | 2:1:2 | 4 | 6.0 | — |
| Example 3 | N,N-bis(2-aminoethyl)-1,1-dimethylpropylamine | isophorone diisocyanate | cyclohexyl isocyanate | 3:2:2 | 6 | 8.0 | — |
| Example 4 | N-(2-aminoethyl)piperazine | hexamethylene diisocyanate | t-butylamine | 2:3:2 | 6 | 8.0 | — |
| Example 5 | N-(2-aminoethyl)piperazine | isophorone diisocyanate | 1-butanol | 3:4:2 | 6 | 8.0 | — |
| Example 6 | N-(2-aminoethyl)piperazine | isophorone diisocyanate | phenyl isocyanate | 17:15:4 | 17 | 8.0 | — |
| Example 7 | N,N-bis(3-aminoethyl)piperazine | isophorone diisocyanate | phenyl isocyanate | 2:1:2 | 4 | 4.0 | Polyurethane polymer of 4.0% by weight described in Example 4 of Kokai No. 7-316922 |
| Comparative example 1 | | | not added | | | | — |
| Comparative example 2 | N-(2-aminoethyl)piperazine | 4,4'-diphenylmethane diisocyanate | phenyl isocyanate | 2:1:2 | 4 | 0.4 | — |
| Comparative example 3 | N-(2-aminoethyl)piperazine | 4-4'-diphenylmethane diisocyanate | phenyl isocyanate | 2:1:2 | 4 | 18.0 | — |
| Comparative example 4 | N-(2-aminoethyl)piperazine | isophorone diisocyanate | phenyl isocyanate | 45:43:4 | 45 | 8.0 | — |
| Comparative example 5 | — | — | — | — | — | — | Polyurethane polymer of 8.0% by weight described in Exam- |

TABLE 1-continued

Composition of urea compound to be added

Urea compound

| | Nitrogen-containing compound (a) | Organic diisocyanate (b) | One kind selected from mono- or di-alkylmonoamine, alkylmonoalcohol and organic monoisocyanate (c) | (a):(b):(c) Reactive molar ratio | Number of urea bonding units | Amount to be added to polyurethane-urea polymer (% by weight) | Known art |
|---|---|---|---|---|---|---|---|
| Comparative example 6 | — | — | — | — | — | — | ple 4 of Kokai No. 7-316922 Potassium benzoate of 0.4% by weight described in Example 1 of Kokai No. 7-150417 |

TABLE 2

Performance and processibility of fiber

| | Elastic function | | Heat durability | | | Dyeability and colot fastness | | | Spinning |
|---|---|---|---|---|---|---|---|---|---|
| | Strength at break (g) | Elongation at break (%) | Elastic recovery (stress-retaining ratio (%) at 200% elongation) (%) | Time lapse until fiber in contact with a hot pillar at 185° C. is broken (seconds) | Strength-retaining ratio after being dry-heated at 180° C. (%) | Thermosettability Thermosettability (%) | Dyed state of knit fabric (grade) | Dyed state of knit fabric after being laundered (grade) | Color contamination of polyamide fiber (grade) | stability Extremity of single filament size (dtex) |
| Example 1 | 26 | 590 | 56 | 32 | 65 | 70 | 5 | 4 | 4 | 1.8 |
| Example 2 | 25 | 585 | 55 | 36 | 69 | 68 | 5 | 4 | 4 | 1.5 |
| Example 3 | 25 | 565 | 54 | 30 | 63 | 67 | 5 | 4 | 4 | 2.1 |
| Example 4 | 29 | 606 | 52 | 34 | 64 | 67 | 4 | 4 | 5 | 2.0 |
| Example 5 | 26 | 578 | 54 | 32 | 65 | 65 | 4 | 4 | 5 | 2.0 |
| Example 6 | 24 | 563 | 50 | 35 | 70 | 62 | 4 | 4 | 4 | 2.2 |
| Example 7 | 26 | 551 | 49 | 38 | 67 | 68 | 5 | 5 | 5 | 2.1 |
| Comparative example 1 | 26 | 596 | 56 | 38 | 72 | 32 | 2 | 1 | 3 | 1.9 |
| Comparative example 2 | 27 | 587 | 55 | 37 | 71 | 38 | 2 | 2 | 4 | 1.9 |
| Comparative example 3 | 14 | 465 | 38 | 12 | 46 | 75 | 5 | 4 | 2 | 3.5 |
| Comparative example 4 | Impossible to be spun | | | — | — | — | — | — | — | — |
| Comparative example 5 | 26 | 477 | 35 | 33 | 67 | 42 | 2 | 1 | 3 | 3.2 |
| Comparative example 6 | 25 | 574 | 56 | 37 | 70 | 48 | 2 | 1 | 3 | 2.0 |

Examples 8 to 10 and Comparative Examples 7 to 9

Zokki panty hose were formed by using the polyurethane-urea elastic fibers obtained from Examples 1, 2 and 7 and Comparative examples 1, 5 and 6.

The estimation results of the panty hose obtained from Examples 8 to 10 and Comparative examples 7 to 9 are shown in Table 3.

TABLE 3

Estimation of the inventive products

| | Estimation of thermo-settability of panty hose Length of leg section of Zokki panty hose (cm) | Test yarn used for knitting |
|---|---|---|
| Example 8 | 61 | Example 1 |
| Example 9 | 63 | Example 2 |
| Example 10 | 58 | Example 7 |
| Comparative example 7 | 47 | Comparative example 1 |
| Comparative example 8 | 50 | Comparative example 5 |
| Comparative example 9 | 48 | Comparative example 6 |

It is apparent from Tables 1 to 3 that the polyurethane-urea elastic fiber according to the present invention is high in thermosettability, excellent in dyeability to result in a good color fastness and superior in elastic function and heat durability, and can be spun in a stable manner.

CAPABILITY OF EXPLOITATION IN INDUSTRY

Since the polyurethane-urea elastic fiber according to the present invention is excellent in shape-retaining property during the heat setting, dyeability during the dyeing process, color fastness to laundering, heat durability and elastic functions, it is suitable for the production of an elastic fabric excellent in elastic functions, capable of being fast dyed, durable against a heat treatment, good in shape-retaining property and free from "grinning". Thus, the present invention provides an elastic fiber material excellent in elastic functions and good in processibility usable for all fields of fabrics such as, as examples, a circular knit fabric such as panty hose, socks or tights, a warp knit fabric such as foundation wear or swim suits and a woven fabric such as outer wear. Particularly, the polyurethane-urea elastic fiber according to the present invention is suitable for Zokki panty hose or warp- or weft-stretchable woven fabric.

What is claimed is:

1. A polyurethane-urea elastic fiber obtained by incorporating a urea compound in a range from 1 to 15% by weight in a polyurethane-urea polymer, which urea compound is prepared by reacting the following compounds together:
   (a) a nitrogen-containing compound having at least one bifunctional amine group selected from a primary amine and a secondary amine, and having at least one nitrogen-containing group selected from a tertiary nitrogen and a heterocyclic nitrogen,
   (b) an organic diisocyanate, and
   (c) at least one compound selected from a group consisting of a mono- or di-alkylmonoamine, an alkylmonoalcohol and an organic monoisocyanate.

2. A polyurethane-urea elastic fiber as defined by claim 1, wherein the urea compound contains average number of urea bonding units ranging from 4 to 40 in one molecule, represented by the following equations (1) and (2):

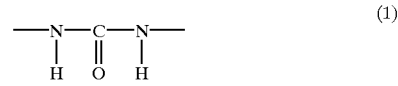

3. A polyurethane-urea elastic fiber as defined by claim 1 or 2, wherein the nitrogen-containing compound is at least one kind selected from a group consisting of piperazine and bifunctional piperazine derivatives.

4. A polyurethane-urea elastic fiber as defined by any one of claims 1 to 3, wherein the compound (c) is an organic monoisocyanate.

5. A polyurethane-urea elastic fiber as defined by any one of claims 1 to 4, wherein a single filament size is in a range from 6 to 33 dtex.

6. A polyurethane-urea elastic fiber as defined by any one of claims 1 to 5, wherein a thermosettability is 50% or more, and a strength-retaining ratio is 50% or more after being dry-heated at 180° C.

7. A method for producing a polyurethane-urea elastic fiber, wherein an intermediate polymer having isocyanate groups at terminals by reacting an excessive molar amount of organic diisocyanate with polyalkylene ether glycol having a number-average molecular weight in a range from 600 to 5000, a diamine compound and a monoamine compound are reacted with each other to obtain a polyurethane-urea polymer, and a urea compound obtained from bifunctional piperazine derivative, organic diisocyanate and organic monoisocyanate is added to the polyurethane-urea polymer in a range from 1 to 15% by weight, all of which are then dissolved into an amide type polar solvent to result in a polyurethane-urea solution which is then dry-spun to become the polyurethane-urea elastic fiber.

* * * * *